(12) United States Patent
Praisner et al.

(10) Patent No.: US 9,157,326 B2
(45) Date of Patent: Oct. 13, 2015

(54) AIRFOIL FOR IMPROVED FLOW DISTRIBUTION WITH HIGH RADIAL OFFSET

(75) Inventors: Thomas J. Praisner, Colchester, CT (US); Noel Modesto-Madera, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 622 days.

(21) Appl. No.: 13/539,627

(22) Filed: Jul. 2, 2012

(65) Prior Publication Data

US 2014/0003925 A1    Jan. 2, 2014

(51) Int. Cl.
*F01D 5/12*    (2006.01)
*F01D 5/14*    (2006.01)

(52) U.S. Cl.
CPC *F01D 5/12* (2013.01); *F01D 5/141* (2013.01); *Y02T 50/673* (2013.01)

(58) Field of Classification Search
CPC ........................................................ F01D 9/041
USPC .................................................. 415/192, 195
See application file for complete search history.

(56) References Cited

U.S. PATENT DOCUMENTS

| | | | |
|---|---|---|---|
| 4,741,667 A * | 5/1988 | Price et al. | 415/191 |
| 5,779,443 A * | 7/1998 | Haller et al. | 415/191 |
| 5,980,209 A | 11/1999 | Barry et al. | |
| 6,368,055 B1 | 4/2002 | Matsuda | |
| 7,387,490 B2 | 6/2008 | Noera | |
| 7,387,495 B2 | 6/2008 | Noera | |
| 7,390,165 B2 | 6/2008 | Francini | |
| 7,390,171 B2 | 6/2008 | Francini | |
| 2002/0098082 A1 | 7/2002 | Ito et al. | |
| 2007/0033802 A1 | 2/2007 | McKeever | |
| 2010/0209238 A1 * | 8/2010 | Praisner et al. | 415/208.2 |

FOREIGN PATENT DOCUMENTS

| | | |
|---|---|---|
| JP | 08-218803 | 8/1996 |
| JP | 08218803 A * | 8/1996 |
| JP | 2003020904 | 1/2003 |

OTHER PUBLICATIONS

Matsuda et al., Turbine Nozzle, Turbine Moving Blade and Turbine Stage, Aug. 27, 1996.*
International Search Report and Written Opinion for International Application No. PCT/US2013/046766 dated Oct. 16, 2013.
International Preliminary Report on Patentability for PCT Application No. PCT/US2013/046766, mailed Jan. 15, 2015.

* cited by examiner

*Primary Examiner* — Edward Look
*Assistant Examiner* — Cameron Corday
(74) *Attorney, Agent, or Firm* — Carlson, Gaskey & Olds, P.C.

(57) ABSTRACT

A vane assembly for use in a gas flow duct. The vane assembly includes multiple vanes arranged circumferentially about the duct. A throat angle of each of the vanes at mid-span is greater than the throat angle at the tips of the vane.

26 Claims, 2 Drawing Sheets

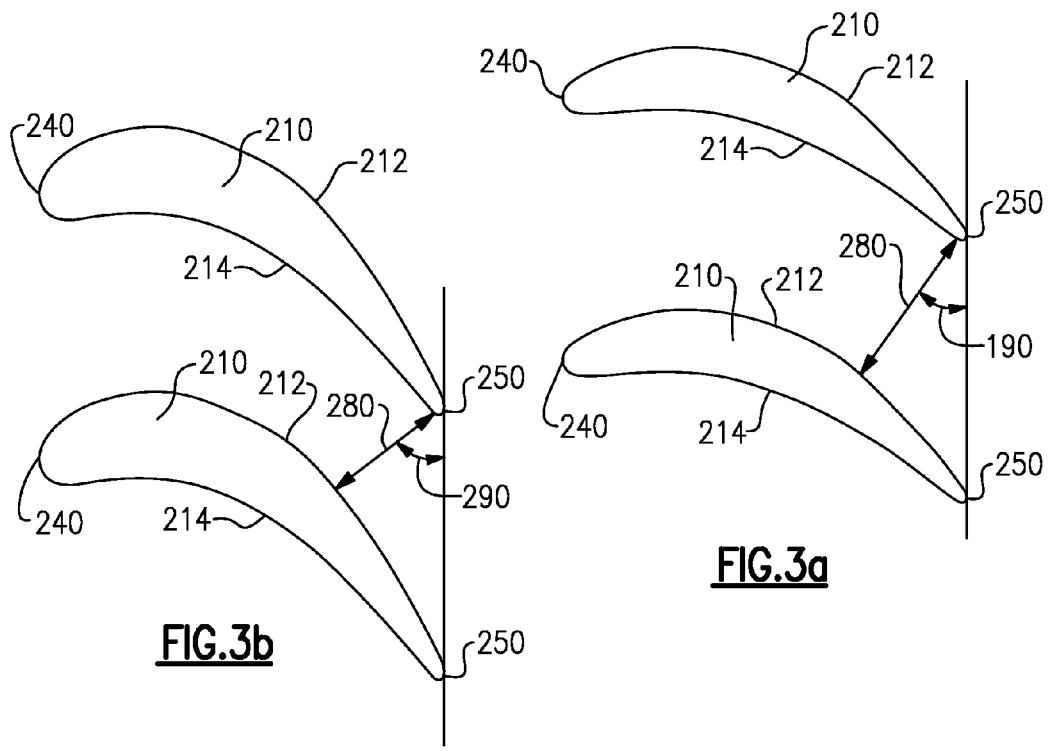
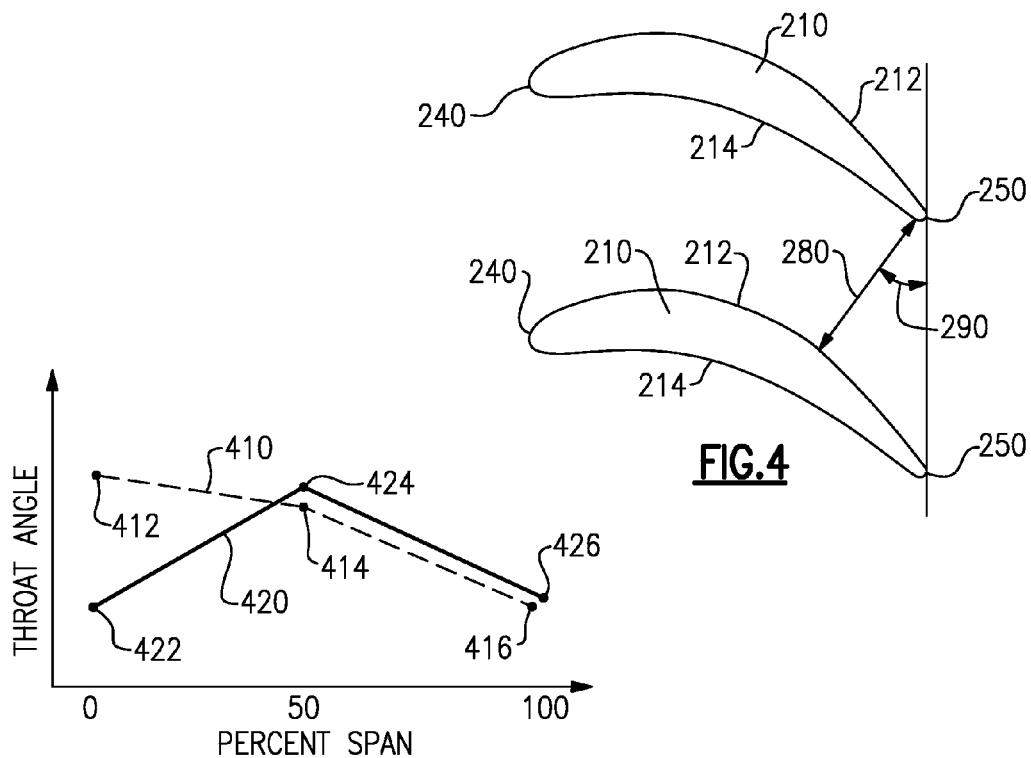

AIRFOIL FOR IMPROVED FLOW DISTRIBUTION WITH HIGH RADIAL OFFSET

TECHNICAL FIELD

The present disclosure is directed to stationary vane assemblies for airflow ducts, and more particularly to a spanwise throat angle distribution for the same.

BACKGROUND OF THE INVENTION

Mechanical systems incorporating airflow ducts, such as jet engines, often include stationary vanes within the airflow ducts. The stationary vanes control airflow through the duct and impart desirable flow characteristics, such as turning, onto the airflow. Known stationary (stator) vanes with a low aspect ratio are typically included in ducts having a relatively long exit duct portion after the trailing edge of the vane. As a result of the low aspect ratio and the relatively long exit duct portion, flow quality problems can arise at the inner diameter and the outer diameter of the duct.

SUMMARY OF THE INVENTION

A vane assembly for a duct according to an exemplary embodiment of this disclosure, among other possible things includes a plurality of vanes arranged circumferentially about an axis defined by a duct, each of said plurality of vanes has a throat distance defining a shortest distance between the vane and an adjacent vane at a constant span, the throat distance defines a throat angle relative to a line tangential to a trailing edge of each of said plurality of vanes, and the throat angle of each vane at mid-span is greater than the throat angle at the tip region of each vane.

In a further embodiment of the foregoing vane assembly, the stationary duct has a duct angle of at least ten degrees, relative to the axis defined by the stationary duct.

In a further embodiment of any of the foregoing vane assemblies, each vane in said plurality of vanes has an aspect ratio of less than or equal to 1.5.

In a further embodiment of any of the foregoing vane assemblies, the plurality of vanes includes an even number of vanes.

In a further embodiment of any of the foregoing vane assemblies, the plurality of vanes includes less than or equal to twenty vanes.

In a further embodiment of any of the foregoing vane assemblies, further including a root throat angle at a root region of the vane, wherein the root throat angle is less than the throat angle.

In a further embodiment of any of the foregoing vane assemblies, the root throat angle is a throat angle measured at less than or equal to 5% span of the vane.

In a further embodiment of any of the foregoing vane assemblies, the tip region throat angle is a throat angle measured at greater than or equal to 95% span of the vane.

In a further embodiment of any of the foregoing vane assemblies, the mid-span throat angle is a smallest throat angle in a range of throat angles between 5% span and 95% span.

In a further embodiment of any of the foregoing vane assemblies, the mid-span throat angle is a smallest throat angle in a range of throat angles between 45% span and 55% span.

In a further embodiment of any of the foregoing vane assemblies, an airflow at an outer diameter of said vane assembly is elevated relative to an airflow at a mid-span region of the vane assembly.

In a further embodiment of any of the foregoing vane assemblies, an airflow at an inner diameter of said vane assembly is elevated relative to an airflow at a mid-span region of the vane assembly.

A jet engine according to an exemplary embodiment of this disclosure, among other possible things includes a gas path duct having a vane assembly. The vane assembly has a plurality of vanes arranged circumferentially about an axis defined by the gas path duct. Each of said plurality of vanes has a throat distance defining a shortest distance between the vane and an adjacent vane at a constant span. The throat distance defines a throat angle relative to a line tangential to a trailing edge of each of said plurality of vanes. The throat angle of each vane at mid-span is greater than the throat angle at the tip region of each vane.

In a further embodiment of the foregoing jet engine, the gas path duct has a duct angle of at least ten degrees, relative to the axis defined by the gas path duct.

In a further embodiment of any of the foregoing jet engines, each of said plurality of vanes has an aspect ratio of less than or equal to 1.5.

In a further embodiment of any of the foregoing jet engines, the plurality of vanes is an even number of vanes.

In a further embodiment of any of the foregoing jet engines, the plurality of vanes is less than or equal to twenty vanes.

In a further embodiment of any of the foregoing jet engines, the plurality of vanes further define a root throat angle, wherein the root throat angle is less than the mid-span throat angle.

In a further embodiment of any of the foregoing jet engines, the root throat angle is a throat angle measured at less than or equal to 5% span of the vane.

In a further embodiment of any of the foregoing jet engines, the tip region throat angle is a throat angle measured at greater than or equal to 95% span of the vane.

In a further embodiment of any of the foregoing jet engines, the mid-span throat angle is a smallest throat angle in a range of throat angles between 5% span and 95% span.

In a further embodiment of any of the foregoing jet engines, the mid-span throat angle is a smallest throat angle in a range of throat angles between 45% span and 55% span.

In a further embodiment of any of the foregoing jet engines, an airflow at an outer diameter of said vane assembly is elevated relative to an airflow at a mid-span region of the vane assembly.

In a further embodiment of any of the foregoing jet engines, an airflow at an inner diameter of said vane assembly is elevated relative to an airflow at the mid-span region of the vane assembly.

These and other features of the present invention can be best understood from the following specification and drawings, the following of which is a brief description.

BRIEF DESCRIPTION OF THE DRAWINGS

FIG. 3a illustrates an outer diameter layer of a vane in one example vane assembly arrangement.

FIG. 3b illustrates a top view of a mid-span layer of the example vane assembly arrangement of FIG. 3a.

FIG. 4 illustrates a top view of a root layer of an optional feature of the example vane assembly arrangement of FIG. 3a.

FIG. 5 illustrates a chart showing a progression of throat angles related to percent span of the example arrangement of FIGS. 3a, 3b and 4.

DETAILED DESCRIPTION

Figure 1:
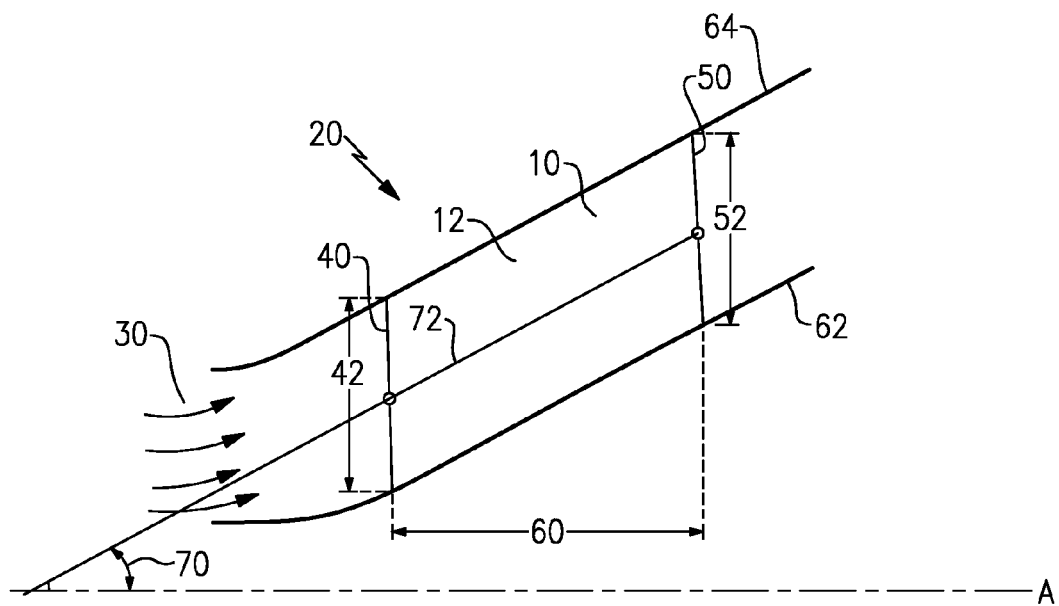
FIG. 1 illustrates a side view of a single stationary vane of a vane assembly in an airflow duct.

FIG. 1 illustrates a stationary vane assembly 10 in a duct 20. The duct 20 is a circular duct and defines an axis A running through the center of the duct 20. The vane assembly 10 includes multiple individual vanes 12 arranged circumferentially about the axis A. In one example, the vanes 12 are substantially identical, and are equidistantly spaced about the vane assembly 10. In one example, there are less than or equal to 20 vanes. In an alternate example there is an even number of vanes. The duct 20 has a duct angle 70 defined as the angle of a mid-span line 72 of the vane 12 relative to the axis A defined by the duct 20. The mid-span line 72 is drawn along the vane 12 at 50% span. An airflow 30 through the duct 20 is shown including arrows illustrating the direction of the airflow 30. The airflow 30 encounters a leading edge 40 of the vane 12 and is forced around the vane 12. The leading edge 40 has a span 42 extending from an inner diameter wall 62 of the duct 20 (0% span) to an outer diameter wall 64 of the duct 20 (100% span). Downstream of the leading edge 40, the airflow 30 encounters a trailing edge 50 of the vane 12 as the airflow 30 passes the vane 12. The trailing edge 50 of the vane 12 has a trailing edge span 52 extending from the inner diameter wall 62 (0% span) to the outer diameter wall 64 (100% span). The axial length of the vane 12 is referred to as the axial chord length 60.

Each vane 12 is in the vane assembly 10 has an aspect ratio that defines features of the vane. The aspect ratio is dependent on the length 42 of leading edge 40 span, the length of the trailing edge 50 span 52, and the length of the axial chord and is defined as being: Aspect Ratio=(leading edge span 42+trailing edge span 52)/(2*axial chord 60). In the illustrated example, the aspect ratio is approximately 1.5. In alternate examples, the aspect ratio is less than 1.5.

Due to the circumferential vane 12 arrangement of the vane assembly 10, the features of each vane 12 define a throat distance between each vane 12 and each adjacent vane 12 at any given span of the vanes 12. The throat distance is the shortest single span distance from one vane 12 to an adjacent vane 12 in the vane assembly 10. The throat distance, as well as the throat angle, varies depending on the span. Thus, the throat distance and the throat angles of the vane assembly 10 will vary depending on what span percentage is being measured.

Figure 2:
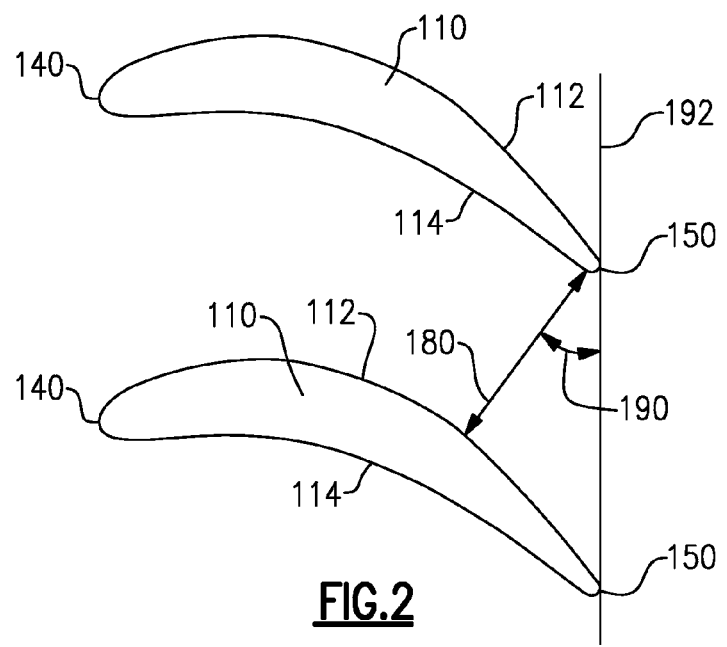
FIG. 2 illustrates a top (tip) view of two stationary vanes in the stationary vane assembly of FIG. 1.

FIG. 2 illustrates a top view of two vanes 110 in the stationary vane assembly 10 illustrated in FIG. 1. Each of the vanes 110 has a leading edge 140 that initially contacts the airflow 30 (illustrated in FIG. 1). As the airflow 30 passes over the vanes 110 in the vane assembly 10, the contours of each individual vane 110 generate a pressure differential between the two sides of the vane 110. In the illustrated example vanes 110, the top side is a suction side 112 and the bottom side of the vanes 110 is a pressure side 114. The airflow immediately adjacent the suction side 112 has a pressure that is lower than the airflow immediately adjacent the pressure side 114.

As described above, the smallest distance between the two adjacent vanes 110, at a constant span percentage, is the throat distance 180. The throat distance at any given span percentage is uniquely defined by a single point on the suction side 112 of one vane 110 and a corresponding single point on the pressure side 114 of an adjacent vane 110. A line drawn along the throat distance 180 defines a throat angle 190 relative to a circumferential line 192 that is tangential to the trailing edge 150 of each of the vanes 110 within the vane assembly 10.

FIGS. 3a and 3b illustrate an outer diameter layer of a vane 210 at a span of 95-100% (FIG. 3a) and a mid-span layer of the vane 210 at a span of 45-55% (FIG. 3b). The tip, or 95-100% span region, is at the outer diameter endwall 64 of the duct 20. As with FIG. 2, each of the illustrated vanes 210 includes a leading edge 240, a pressure side 212, a suction side 214, and a trailing edge 250. The throat distance 280 at the mid-span (FIG. 3b) is shorter than the throat distance 280 at the tip (95-100% span). Similarly, the suction side point defining the throat distance at the tip on each vane 210 is axially downstream from the suction side point defining the throat distance 280 at mid-span on each vane 210. Because of this relationship, the throat angle 290 at mid-span is larger than the throat angle 290 at the tip, and airflow angle at the tip is opened up relative to airflow at mid-span.

FIG. 4 illustrates an optional feature of the root portion (0-5% span) of the vanes 210 that can be included in the vane assembly illustrated in FIGS. 3a and 3b. The root, or 0-5% span region of the vane 210, is at the inner diameter endwall 62 of the duct 20. In the optional feature, the suction side point defining the throat distance 280 at the root (0-5% span) of the vane 210 is downstream of the suction side point defining the throat distance 280 at mid-span (45-55% span). As a result of this feature, the throat angle 290 at mid-span of the vane 210 in the example of FIGS. 3a, 3b and 4 is larger than the throat angle 290 at either the tip (95-100% span) or the root (0-5% span), and the airflow at the outer diameter and the inner diameter is opened up relative to airflow at mid-span.

FIG. 5 illustrates a chart showing the throat angles, with respect to percent span, of the example vane of FIG. 3a, 3b without the inclusion of the feature of FIG. 4 as line 410 and with the inclusion of the feature of FIG. 4 as line 420. As can be seen by line 410, in the example not including the optional feature of FIG. 4 the throat angle has a small decline at a first rate as the percent span of the vane increases from 0% span 412 (the root of the vane) to mid-span 414, and then sharply declines at a second rate from mid-span 414 to 100% span 416 (the tip of the vane). The second rate is greater than the first rate. In the line 420, for the example where the optional feature of FIG. 4 included, the throat angle starts with a low throat angle at 0% span 422 (the root of the vane) and increases until it reaches mid-span 424 (45-55% span), where the throat angle begins decreasing again until 100% span 426 (the tip).

In the example of FIG. 4, the vanes 210 are designed with relatively open throat angles near the root (inner diameter wall) and tip (outer diameter wall) and a relatively closed throat angle near the mid-span of the vane. As used herein, a relatively open throat angle refers to a throat angle which is relatively open to airflow, and a relatively closed throat angle refers to a throat angle which is relatively closed to airflow. By utilizing this varied throat angle configuration, the airflow along the end walls (where the throat angle is minimized) is increased relative to the flows at the mid-span line. This airflow vortexing achieves a better flow distribution including more flow to the end wall regions of the duct 20. In one example implementation, the above described features are included in a vane assembly in a gas path of a jet engine.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A vane assembly for a duct comprising:
a plurality of vanes arranged circumferentially about an axis defined by a duct;
wherein each of said plurality of vanes has a throat distance defining a shortest distance between the vane and an adjacent vane at a constant span;
wherein the throat distance defines a throat angle relative to a line tangential to a trailing edge of each of said plurality of vanes;
wherein a throat angle of each vane at mid-span is greater than a throat angle at the tip region of each vane; and
wherein a throat angle at 0% -5 % span is greater than a throat angle at mid-span, and the throat angle at mid-span is greater than a throat angle at 95%-100% span, and the throat angle decreases at a first rate as a percent span increases from 0% span to mid-span, the throat angle decreases at a second rate as a percent span increase from mid-span to 100% span, and the second rate is greater than the first rate.

2. The vane assembly of claim 1, wherein said duct has a duct angle of at least ten degrees, relative to the axis defined by the duct.

3. The vane assembly of claim 1, wherein each vane in said plurality of vanes has an aspect ratio of less than or equal to 1.5.

4. The vane assembly of claim 1, wherein said plurality of vanes includes an even number of vanes.

5. The vane assembly of claim 1, wherein said plurality of vanes includes less than or equal to twenty vanes.

6. The vane assembly of claim 1, further comprising a root throat angle at a root region of the vane, wherein the root throat angle is less than the throat angle of the vane at mid-span.

7. The vane assembly of claim 6, wherein the root throat angle is a throat angle measured at less than or equal to 5% span of the vane.

8. The vane assembly of claim 1, wherein the tip region throat angle is a throat angle measured at greater than or equal to 95% span of the vane.

9. The vane assembly of claim 1, wherein said mid-span throat angle is a smallest throat angle in a range of throat angles between 5% span and 95% span.

10. The vane assembly of claim 9, wherein said mid-span throat angle is a smallest throat angle in a range of throat angles between 45% span and 55% span.

11. The vane assembly of claim 1, wherein an airflow at an outer diameter of said vane assembly is elevated relative to an airflow at a mid-span region of the vane assembly.

12. The vane assembly of claim 11, wherein an airflow at an inner diameter of said vane assembly is elevated relative to an airflow at a mid-span region of the vane assembly.

13. The vane assembly of claim 1, wherein a throat distance at less than or equal to 5% span is defined by a first suction side point, a throat distance at mid-span is defined by a second suction side point, and the first suction side point is downstream of the second pressure side point.

14. The vane assembly of claim 13, wherein the throat distance at mid-span is a throat distance between 45% span and 55% span.

15. A jet engine comprising:
a gas path duct having a vane assembly, wherein the vane assembly has a plurality of vanes arranged circumferentially about an axis defined by the gas path duct;
wherein each of said plurality of vanes has a throat distance defining a shortest distance between the vane and an adjacent vane at a constant span;
wherein the throat distance defines a throat angle relative to a line tangential to a trailing edge of each of said plurality of vanes;
wherein the throat angle of each vane at mid-span is greater than the throat angle at the tip region of each vane; and
wherein a throat angle at 0% -5% span is greater than a throat angle at mid-span, and the throat angle at mid-span is greater than a throat angle at 95%-100% span, and the throat angle decreases at a first rate as a percent span increases from 0% span to mid-span, the throat angle decreases at a second rate as a percent span increase from mid-span to 100% span, and the second rate is greater than the first rate.

16. The jet engine of claim 15, wherein said gas path duct has a duct angle of at least ten degrees, relative to the axis defined by the gas path duct.

17. The jet engine of claim 16, wherein each of said plurality of vanes has an aspect ratio of less than or equal to 1.5.

18. The jet engine of claim 15, wherein said plurality of vanes is an even number of vanes.

19. The jet engine of claim 15, wherein said plurality of vanes is less than or equal to twenty vanes.

20. The jet engine of claim 15, wherein said plurality of vanes further define a root throat angle, wherein the root throat angle is less than the mid-span throat angle.

21. The jet engine of claim 20 wherein the root throat angle is a throat angle measured at less than or equal to 5% span of the vane.

22. The jet engine of claim 15, wherein the tip region throat angle is a throat angle measured at greater than or equal to 95% span of the vane.

23. The jet engine of claim 15, wherein said mid-span throat angle is a smallest throat angle in a range of throat angles between 5% span and 95% span.

24. The jet engine of claim 23, wherein said mid-span throat angle is a smallest throat angle in a range of throat angles between 45% span and 55% span.

25. The jet engine of claim 15, wherein an airflow at an outer diameter of said vane assembly is elevated relative to an airflow at a mid-span region of the vane assembly.

26. The jet engine of claim 25, wherein an airflow at an inner diameter of said vane assembly is elevated relative to an airflow at the mid-span region of the vane assembly.

* * * * *